United States Patent [19]

Bobsein

[11] Patent Number: 5,138,019
[45] Date of Patent: * Aug. 11, 1992

[54] POLY(ARYLENE SULFIDE SULFONE) POLYMER CONTAINING ETHER GROUPS

[75] Inventor: Rex L. Bobsein, Bartlesville, Okla.

[73] Assignee: Phillips Petroleum Company, Bartlesville, Okla.

[*] Notice: The portion of the term of this patent subsequent to Feb. 28, 2006 has been disclaimed.

[21] Appl. No.: 487,487

[22] Filed: Feb. 28, 1990

[51] Int. Cl.$^5$ ................. C08G 23/00; C08L 81/04
[52] U.S. Cl. .................................. 528/125; 528/126; 528/171; 528/174
[58] Field of Search ................ 528/171, 174, 125, 126

[56] References Cited

U.S. PATENT DOCUMENTS

| | | | |
|---|---|---|---|
| 4,016,145 | 4/1977 | Campbell | 260/79.3 M |
| 4,108,837 | 8/1978 | Johnson et al. | 528/126 |
| 4,175,175 | 11/1979 | Johnson et al. | 528/125 |
| 4,808,694 | 2/1989 | Edmonds et al. | 528/125 |

Primary Examiner—John Kight, III
Assistant Examiner—T. Mosley
Attorney, Agent, or Firm—Beverly M. Dollar

[57] ABSTRACT

A two-step process to make a poly(arylene sulfide sulfone) polymer containing ether groups having high molecular weights is described. In the first step an aromatic diphenol, a dihaloaromatic sulfone, a polar organic compound and an alkali metal base are reacted at an elevated temperature. During the first step the reactor is vented. Subsequently, a sulfur source is added to form a poly(arylene sulfide sulfone) polymer containing ether groups. An alkali metal carboxylate is also present in the second step. The polymers prepared by the invention method exhibit higher inherent viscosities, indicating higher molecular weight.

21 Claims, No Drawings

POLY(ARYLENE SULFIDE SULFONE) POLYMER CONTAINING ETHER GROUPS

FIELD OF THE INVENTION

This invention relates to poly(arylene sulfide sulfone) polymers, PASS. In another of its aspects this invention relates to a process for the production of poly(arylene sulfide sulfone) polymers containing ether groups. In accordance with a further aspect this invention relates to a two step process for the production of p-phenylene sulfide sulfone polymers containing ether groups which exhibit high molecular weights.

BACKGROUND OF THE INVENTION

A wide variety of high polymers have been prepared from aromatic compounds, many of which are currently produced and marketed on a moderate to large scale. While such polymers are useful in many areas, one property of high polymers, particularly those of the thermoplastic type, which needs to be improved is the ability to withstand high use temperatures. Thermoplastic high polymers frequently form a continuous matrix for reinforcing agents and fillers which are added to alter the properties of the polymers before they are shaped into useful articles such as electrical and automotive parts. High polymers that will withstand high use temperatures alone or in combination with other ingredients are desirable.

Accordingly, an object of this invention is to provide a process for producing poly(arylene sulfide sulfone) polymers containing ether groups exhibiting good high temperature properties and increased molecular weight. It is a further objective of this invention to provide a process employing aromatic diphenols for the preparation of poly(arylene sulfide sulfone) polymers containing ether groups suitable for melt shaping useful articles.

SUMMARY OF THE INVENTION

In accordance with this invention a high molecular weight poly(arylene sulfide sulfone) polymer containing an ether link in the polymer backbone is prepared. In a first step a prepolymer comprising essentially dihalo-terminated polyethersulfone oligomers can be prepared by reacting an aromatic diphenol with a substantial excess of a dihalo aromatic sulfone, in the presence of a polar organic compound and an alkali metal base, and optionally in the presence of an alkali metal carboxylate. During this first step, the reaction mixture is vented when the reactor temperature is in the range of 100° to 150° C. Subsequently, in a second step a sulfur source, an alkali metal carboxylate and water are added to the reaction mixture and the polymerization reaction is continued, resulting in a modified poly(arylene sulfide sulfone) polymer of improved glass transition temperature and softening temperature.

As used herein, the term "irregular polymer" is meant to represent a polymer whose molecules cannot be described by only one species of repeating unit in a single sequential arrangement. The polymers produced by the invention process include aromatic (arylene), sulfide, sulfone and ether groups in the backbone. These groups can be alternating in any sequence and in sequences such that blocks of a repeating unit are present.

Dihaloaromatic sulfones that can be employed in the process of the invention are bis(halophenyl) sulfones, optionally having each phenyl ring substituted with one to four R groups, wherein each R group is individually and independently selected from the group consisting of hydrogen and alkyl groups having 1 to about 4 carbon atoms, and the total number of carbon atoms in each molecule is within the range of 12 to about 44. The presently preferred bis(halophenyl) sulfone is bis(p-chlorophenyl) sulfone.

Examples of suitable bis(halophenyl) sulfones that can be employed in the process of this invention include bis(p-chlorophenyl)sulfone, bis(fluorophenyl)sulfone, bis(p-bromophenyl)sulfone, bis(iodophenyl)sulfone, bis(2-methyl-4-chlorophenyl)sulfone, bis(2,5-dimethyl-4-chlorophenyl)sulfone, p-chlorophenyl p-bromophenyl sulfone, bis(3-isopropyl-4-iodophenyl)sulfone, bis(2,5-dipropyl-4-chlorophenyl)sulfone, bis(2-butyl-4-fluorophenyl)sulfone, bis(2,3,5,6-tetramethyl-4-chlorophenyl)sulfone, and the like, and mixtures thereof.

One type of aromatic diphenol that can be employed in the process of this invention is bis(alkylhydroxyphenyl) derivatives having the generalized structure.

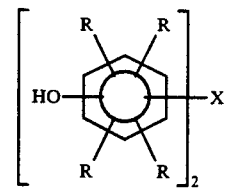

where X is —S—, —SO—, —SO$_2$—, —O—, a bond or an alkylene radical, and wherein each R is individually and independently selected from the group consisting of hydrogen and alkyl groups having 1 to about 4 carbon atoms. Examples of aromatic diphenols where X is —S— or —SO$_2$— include bis(4-hydroxyphenyl)sulfide (Bisphenol T), and bis(4-hydroxyphenyl)sulfone (Bisphenol S).

When X is an alkylene radical, the aromatic diphenols are bis(alkylhydroxyphenyl) alkanes which are characterized by having an alkylene radical link between two phenolic groups as represented by the formula (1)

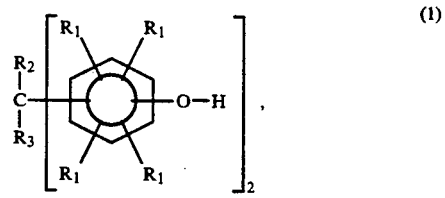

where each $R_1$ is individually and independently selected from the group consisting of hydrogen and alkyl groups having 1 to about 4 carbon atoms, and each $R_2$ and $R_3$ are individually and independently selected from the group consisting of hydrogen and unsubstituted and substituted alkyl groups having 1 to about 11 carbon atoms where the sum of the carbon atoms represented by $R_2$ plus $R_3$ is less than 12 carbon atoms, and the sum of the carbon atoms in $R_1$, $R_2$, and $R_3$ groups do not exceed 43; thus the total number of carbon atoms in each molecule is within the range of 13 to about 55.

Examples of suitable aromatic diphenols having this structure that can be employed in the process of this invention include, among others: bis(4-hydroxyphenyl)-methane, bis(2-hydroxyphenyl)methane, 1,1-bis(4- hydroxyphenyl)ethane, 2,2-bis(4-hydroxyphenyl)propane, 2,2-bis(4-hydroxyphenyl)butane, 2,2-bis(3-methyl-4-hydroxyphenyl)propane, 2,2-bis(2-isopropyl-4-hydroxyphenyl)propane, 2,2-bis(3-butyl-4-hydroxyphenyl)propane, 2,2-bis(4-hydroxyphenyl) 1,1,1,3,3,3-hexafluoropropane, and the like, and mixtures thereof. Preferred are 2,2-bis(4-hydroxyphenyl)propane, commonly known as Bisphenol A, and 2,2-bis(4-hydroxyphenyl) 1,1,1,3,3,3-hexafluoropropane, commonly known as Hexafluorobisphenol A.

Examples of other types of aromatic diphenols include hydroquinone(s), biphenol(s), dihydroxynaphthalene(s), bis(hydroxyphenyl)ketone(s), dihydroxyphenylphenylketone(s), dihydroxyfluorenone(s) and alkyl and aryl ring-substituted derivatives thereof.

Polymerizable sulfur sources that can be employed in the process of this invention include hydrogen sulfide, alkali metal hydrosulfides such as sodium hydrosulfide, potassium hydrosulfide, alkali metal sulfides such as sodium sulfide or potassium sulfide, and mixtures thereof. Additional sulfur sources include, among others, those cited in U.S. Pat. No. 3,919,177 such as the acyclic and cyclic thioamides exemplified by N-methyl-2-pyrrolidinethione.

Alkali metal bases that can be employed in the process of this invention include lithium hydroxide, sodium hydroxide, potassium hydroxide, rubidium hydroxide, cesium hydroxide, lithium carbonate, sodium carbonate, potassium carbonate and mixtures thereof. In one embodiment an alkali metal hydroxide is added in the second step as the anhydrous solid. In a preferred embodiment sodium carbonate is added in the first step in an amount required for both steps.

Alkali metal carboxylates that can be employed in the process of this invention can be represented by the formula R'COOM, where R' is a hydrocarbyl radical selected from alkyl, cycloalkyl, and aryl, and combinations thereof such as alkylaryl, arylalkyl, and the like, the number of carbon atoms in R' being within the range of 1 to about 20, and M is an alkali metal selected from the group consisting of lithium, sodium, potassium, rubidium and cesium. Preferably, R' is an alkyl radical having 1 to about 6 carbon atoms or a phenyl radical, and M is sodium. If desired, the alkali metal carboxylate can be employed as a hydrate or as a solution or dispersion in a liquid. In a preferred embodiment the alkali metal carboxylate is added as the anhydrous salt.

Examples of some alkali metal carboxylates that can be employed in the process of this invention include lithium acetate, sodium acetate, potassium acetate, lithium propionate, sodium propionate, rubidium butyrate, lithium valerate, sodium valerate, cesium hexanoate, lithium cyclohexane carboxylate, potassium benzoate, sodium benzoate, lithium benzoate, and the like, and mixtures thereof. Sodium acetate is the preferred alkali metal carboxylate.

The polar organic compounds that can be used in the method of this invention should be substantially liquid at the reaction temperatures and pressures employed. It is preferred to use organic amides. Suitable amides can be cyclic or acyclic and can have 1 to about 10 carbon atoms per molecule. Examples of suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, epsilon-caprolactam, dimethyl-benzamide and the like, and mixtures thereof. N-methyl-2-pyrrolidone (NMP) is the presently preferred polar organic compound.

Other suitable polar organic compounds include 1,3-dimethyl-2-imidazolidinone, dimethylsulfoxide, sulfolane, tetramethylurea, and hexamethylphosphoramide and mixtures thereof with an organic amide such as exemplified in the preceding paragraph.

The preferred poly(arylene sulfide sulfone) polymers produced by the process of this invention can be characterized as irregular polymers, the molecules of which cannot be described by only one species of unit in a single sequential arrangement. The irregular polymers can be characterized as having at least the units of (a)-(thio-1,4-phenylenesulfonyl-1,4-phenylene)-, illustrated by the formula (2)

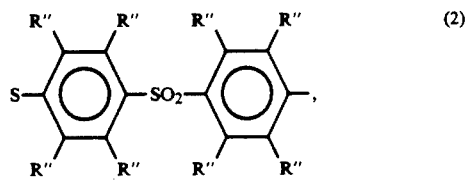

where each R" is individually and independently selected from the group consisting of hydrogen and alkyl groups having 1 to about 4 carbon atoms, wherein the total number of carbon atoms in each unit is within the range of 12 to about 44, and (b)-(oxy-1,4-phenylene-alkylene-1,4-phenyleneoxy-1,4-phenylenesulfonyl-1,4-phenylene) illustrated by the formula (3)

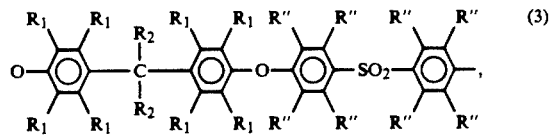

where $R_1$, $R_2$, and $R_3$ can be defined as in formula (1) and where R" can be defined as in formula (2) above, and wherein units (b) are randomly dispersed among sequences of variable length of units (a).

A wide variety of reaction conditions can be employed in the practice of the invention. Similarly, any proportions of reactants which will react with each other to produce the irregular polymers of the invention are within the scope of the invention.

In the first step of the inventive process the aromatic diphenol is reacted with an excess of the dihaloaromatic sulfone, the excess conveniently being expressed as the ratio of moles dihaloaromatic sulfone to moles aromatic diphenol. This molar ratio can vary from about 1000/1 to about 1.001/1 as a broad range, preferably from about 100/1 to about 1.01/1, and most preferably from about 10/1 to about 4/1.

In the first step of the preferred inventive process, for example, the mole ratio of reactants can be chosen such that the dihalo-terminated polyethersulfone oligomers formed are characterized as predominantly comprising the oligomer resulting from the reaction of two moles of the dihaloaromatic sulfone with one mole of aromatic diphenol.

Such oligomers are achieved by conducting the reaction at a molar ratio of dihaloaromatic sulfone to aromatic diphenol within the range of about 8/1 to about 20/1 in the first step. The mole ratio of alkali metal base to aromatic diphenol can vary but generally will be within the range of about 2/1 to about 25/1, preferably about 10/1 to about 20/1. The amount of polar organic compound can vary greatly, generally being within the range of about 5 moles to about 15 moles per mole of the dihaloaromatic sulfone, preferably about 6 to about 10 moles. When the optional alkali metal carboxylate is added in the first step, the mole ratio of alkali metal carboxylate to dihaloaromatic sulfone can vary over a wide range but generally will be within the range of about 0.5/1 to about 3/1, preferably about 1/1 to about 2/1.

In the second step of the inventive process, the amount of sulfur source added is chosen such that the ratio of the moles of dihaloaromatic sulfone minus the moles of aromatic diphenol to the moles sulfur source, can be within the range of about 2/1 to about 0.8/1, preferably about 1.25/1 to about 0.9/1, and most preferably about 1.05/1 to about 0.95/1. The molar ratio of alkali metal base to sulfur source added in the second step can be within the range of about 0.5/1 to about 3/1, preferably about 1.1/1 to about 2.2/1. When the alkali metal carboxylate is added totally in the second step, the molar ratio of alkali metal carboxylate to dihaloaromatic sulfone charged can vary over a wide range, but generally will be within the range of about 0.5/1 to 2/1.

A polar organic compound is used as a transfer medium during the addition of sulfur source and alkali metal carboxylate. Water is also added to bring the total water, including water of hydration, present in the polymerization system to an amount of at least about 3.5 moles water per mole of sulfur source and an amount greater than about 0.5 moles per mole of polar organic compound. Water of hydration can be contained in the sulfur source and the alkali metal base and must be taken into account.

When N-methyl-2-pyrrolidone (NMP) is used as the polar organic compound, the NMP and water are added in amounts such that the ratio of the moles total water including water of hydration to the moles total NMP is greater than about 0.5, preferably in the range from about 0.8 to about 1.5.

It is to be understood that the process of this invention can be carried out by mixing the dihaloaromatic sulfone, the aromatic diphenol, the alkali metal base, the polar organic compound and optionally, the alkali metal carboxylate in any order in a first process step. Then, in a second process step the sulfur source, the alkali metal carboxylate and, if required, the remaining quantity of the alkali metal base and polar organic compound are added. The alkali metal carboxylate must be added in this step when it is not present in the first step.

Although the temperature at which reaction in the first process step is conducted can vary over a considerable range, generally it is within the range of about 150° to about 250° C., preferably about 160° to about 225° C., and most preferably about 175° to about 200° C.

It has been discovered that poly(arylene sulfide sulfone) polymers containing ether groups which have high molecular weight can be prepared by venting the reactor during the first step. The venting procedure is preferably performed in the range of 100°–150° C., preferably about 120° C. The venting procedure is performed until all or at least a portion of the water has been removed. The amount of time during which the venting is continued is generally governed by process and economic limitations and can be determined by one of ordinary skill in the art without undue experimentation.

The reaction temperature in a second process step generally is within the range of about 175° to about 235° C., preferably about 190° to about 215° C., and most preferably about 195° to about 205° C.

The reaction time of each of the two process steps can vary widely, depending in part on the reaction temperature, but generally will be within the range of about 1 minute to about 24 hours, preferably about 5 minutes to about 8 hours. The pressure should be sufficient to maintain the dihaloaromatic sulfone and the polar organic compound substantially in the liquid phase.

After the second step of the reaction has proceeded for the desired time, the reaction mixture is cooled. The mixture can be cooled slowly by discontinuation of the heating, or alternately, more rapidly by introduction of a coolant through internal or external coils. In a preferred embodiment a fluid is added to the reaction mixture after the heating is discontinued to cool it more rapidly and in some cases aid in the separation of the polymer from the remainder of the reaction mixture. Water, N-methyl-2-pyrrolidone or mixtures thereof can be added during a time period which is shorter than the second step reaction time. For example, liquid NMP in an amount equivalent to about ⅛ to ¼ of the total NMP used in the two-step reaction process is added to the reaction mixture over a five minute period after the heat is discontinued. The reaction mixture is allowed to cool further before the polymeric solids are recovered. Use of a fluid improves the recovery of polymeric solids in that particles easily recovered by filtration are formed.

The poly(arylene sulfide sulfone) polymers produced by the inventive process can be separated from the reaction mixture by conventional procedures such as by filtration, followed by washing the recovered solids with water, or by dilution of the reaction mixture with a suitable diluent such as N-methyl-2-pyrrolidone and/or water followed by filtration and water washing of the recovered solids.

The poly(arylene sulfide sulfone) polymers recovered are characterized by having a polymer melt temperature in excess of about 250° C., preferably in excess of about 275° C., and even more preferably in excess of about 290° C., and a measurable melt flow rate using ASTM D 1238 condition 317/5.0 (modified employ a 5 minute preheat time) of less than about 5000 g/10 minutes, preferably less than about 1000 g/10 minutes, and even more preferred less than about 100 g/10 minutes. Polymers prepared according to this invention generally exhibit an inherent viscosity (0.5 g/100 mL NMP at 30°/C.) greater than about 0.30 dL/g, more preferably from about 0.30 to about 0.60 dL/g.

Optionally, treatment of the dried polymeric solids with a aqueous solution containing 0.01 to 5 wt % zinc acetate based on dry polymer in 5 to 50 fold amounts of water (relative to dry polymer) for about 0.5 to about 2 hours at about 150° to about 200° C. can yield treated-polymeric solids having an improved melt stability.

Melt stability of a polymeric solid can be characterized as the ratio of the melt flow rates measured after 5 and 15 minutes holding time of the molten polymeric solids in the barrel of the apparatus described in ASTM D 1238, condition 317/5.0. A melt stable polymeric solid demonstrates only a small difference in the two measured melt flow rates. Therefore, the ratio of the two melt flow rates does not vary appreciably from 1, preferably in the range from about 0.80 to about 1.2. Unless otherwise noted herein, melt flow rates are measured using a 5 minute hold time and reported in units of grams/10 minutes in accordance with ASTM D 1238, condition 317/5.0.

The poly(arylene sulfide sulfone) polymers produced by the inventive process can be blended with fillers, pigments, extenders, other polymers, and the like. They can be employed as the continuous matrix in fiber reinforced compositions such as prepregs, laminates and pultruded shapes. They can be cured through crosslinking and/or chain extension to provide cured products having high thermal stability and good chemical resistance. They are useful in the production of coatings, film, molded objects and fibers. The polymers exhibit improved properties, especially the melting temperature and the glass transition temperature.

Polymer melt temperature, PMT, is expressed in degrees Celsius, and is determined by observing where the polymeric solids melt on a temperature gradient bar. The glass transition temperature, Tg, is measured using Perkin-Elmer Differential Scanning Calorimeter, Model DSC-2C. The inherent viscosity of the polymeric solids is measured at 30° C. using as solvent either a 3:2 mixture (by weight) of phenol:1,1,2,2-tetrachloroethane or N-methyl-2-pyrrolidone at a solids concentration of 0.5 grams per 100 mL. The units of inherent viscosity (I.V.) are deciliters per gram, dL/g.

EXAMPLE 1

Into a 2-gallon stainless steel autoclave 1.5 moles bis(4-chlorophenyl)sulfone 430.76 grams), 3 moles sodium carbonate (318.0 grams), 6.0 moles N-methyl-2-pyrrolidone (594.78 grams), and 0.15 moles Bisphenol A (34.24 grams) were introduced. The autoclave was closed and purged with nitrogen simultaneously with heating and stirring at 600 rpm. The temperature was increased to 200° C. and held for 6 minutes. The autoclave was cooled to less than 80° C. Subsequently, the reactants of the second step were introduced: 1.5 moles sodium acetate (123.06 grams), 1.34 moles sodium hydrosulfide (126.96 grams as a 59 wt. % aqueous solution), 6.0 moles N-methyl-2-pyrrolidone, and 10.48 moles water (188.81 grams). The autoclave temperature was increased to 200° C. and maintained at that temperature for 3 hours. The use of 1.34 moles of sodium hydrosulfide was less than the stoichiometric amount necessary for the reaction, resulting in effect in an excess of the chloroterminated monomer of 1%. The autoclave was then cooled to room temperature and opened to remove the polymer slurry.

The dried product was characterized as having small to medium particle size, a melt flow (MF) of 48.9 and an I.V. of 0.33. A total of 393.6 grams of dried polymeric solids was recovered.

EXAMPLE 2

A second polymerization was conducted in a manner very similar to that of Example 1. The same amounts and types of reactants were added as in Example 1. The autoclave was closed and purged with nitrogen simultaneously with heating and stirring at 600 rpm. When the contents of the reactor reached 120° C., the reactor was opened to vent gasses until 0 psig was reached. The reactor was closed and the temperature was increased to 200° C. and held for 6 minutes. Then the reactor was cooled to less than 80° C. Subsequently the reactants of the second step were introduced in amounts and compounds exactly as in Example 1. The polymer was recovered as in Example 1.

The dried product was characterized as having small to medium particle size, a MF of 29.5 and an I.V. of 0.36. A total of 390.9 grams of dried polymeric solids was recovered.

For ease of comparison, the results of the testing of the polymers prepared in Examples 1 and 2 are tabulated in Table I hereinbelow.

EXAMPLE 3

Two more polymerizations were conducted. Polymer 3 was prepared in essentially the same manner as that of Example 1, except that the Bisphenol A was recrystallized to remove impurities prior to its use as a reactant, and less sodium hydrosulfide was added, resulting in stoichiometric amount of reactants rather than an excess of Bisphenol A as in Example 1.

Polymer 4 was prepared in essentially the same manner as the polymer of Example 2 except that a stoichiometric amount of sodium hydrosulfide was used and recrystallized Bisphenol A was employed. Polymers 3 and 4 were analyzed according to the methods disclosed herein. The results of the analysis are set out in Table 1.

TABLE 1

| Polymer | Venting Step | Yield | MF | IV |
| --- | --- | --- | --- | --- |
| 1 (Comparison) | No | 393.6 | 48.9 | 0.33 |
| 2 (Invention) | Yes | 390.9 | 29.5 | 0.36 |
| 3 (Comparison) | No | 393.0 | 11.4[a] | 0.35 |
| 4 (invention) | Yes | 374.7 | 4.6 | 0.43 |

[a]This melt flow determination was performed at 300° C. rather than the standard 317° C.

The results set out in Table 1 clearly demonstrate that use of the invention venting procedure during the preparation of the polymer results in a polymer exhibiting a lower melt flow rate and a higher inherent viscosity, indicating a higher molecular weight.

While this invention has been described in detail for the purposes of illustration, it is not meant to be limited thereby, but is intended to cover all reasonable modifications thereof.

That which is claimed is:

1. A process comprising:
   (a) reacting in an enclosed vessel, a polar organic compound, a dihaloaromatic sulfone, an aromatic diphenol, and an alkali metal base at a temperature in the range of 150° C. to 250° C. for a time period in the range of about 1 minute to 24 hours, wherein the molar ratio of dihaloaromatic sulfone to diphenol is in the range of about 8:1 to 20:1; wherein the vessel is vented during heat up in the first step while the temperature is in the range of 100° C. to 150° C., to remove gasses therefrom; and then
   (b) adding a sulfur source to the contents of the vessel and raising the temperature of the contents of the vessel to a temperature in the range of 175° C. to 235° C. for a time period in the range of 1 minute to 24 hours to form a recoverable poly(arylene sulfide sulfone) polymer containing ether groups.

2. The process of claim 1 wherein in step (c) an alkali metal carboxylate is further added, said alkali metal carboxylate being represented by R'COOM, where R' is a hydrocarbyl radical selected from the group consisting of alkyl, cycloalkyl, aryl and combinations thereof with carbon atoms in the range of 1 to about 20 and M is an alkali metal.

3. The process of claim 2 wherein R' is an alkyl radical having 1 to about 6 carbon atoms or a phenyl radical and M is sodium.

4. The process of claim 2 wherein in step (c) water is further added to bring the total water, including water of hydration, present to an amount of at least about 3.5 moles per mole of sulfur source and greater than about 0.5 moles per mole polar organic compound.

5. The process of claim 2 wherein in step (c) N-methyl-2-pyrrolidone and water are added in amounts such that the molar ratio of the moles total water including water of hydration to the total moles NMP is in the range of about 0.8 to about 1.5.

6. The process of claim 5 wherein the molar ratio of water to NMP is in the range of about 1 to about 2.

7. The process of claim 1 wherein the aromatic diphenol is characterized by having an alkylene radical link between two phenolic groups and the dihalo aromatic sulfone is a bis(halophenyl)sulfone.

8. The process of claim 7 wherein the aromatic diphenol is 2,2-bis(p-hydroxyphenyl)propane and the bis(halophenyl)sulfone is bis(p-chlorophenyl)sulfone.

9. The process of claim 1 wherein the alkali metal base is selected from the group consisting of an alkali metal hydroxide and an alkali metal carbonate.

10. The process of claim 9 wherein the alkali metal base is an alkali metal carbonate.

11. The process of claim 10 wherein the alkali metal carbonate is sodium carbonate.

12. The process of claim 7 wherein the aromatic diphenol is 2,2-bis(hydroxyphenyl)1,1,1,3,3,3-hexafluoropropane and the bis(halophenyl)sulfone is bis(chlorophenyl)sulfone.

13. The process of claim 7 wherein the alkali metal hydrosulfide is sodium hydrosulfide.

14. The process of claim 7 wherein (a) the alkali metal base to the aromatic diphenol molar ratio is in the range of about 2/1 to 25/1 and wherein (b) the ratio of the moles of bis(halophenyl)sulfone minus the moles of aromatic diphenol employed in step (a) to moles of sulfur source added in step (c) is in the range of about 1.05/1 to about 0.95/1, the molar ratio of alkali metal base to sulfur source is in the range of about 0.5/1 to about 3/1, and the molar ratio of alkali metal carboxylate to bis(halophenyl)sulfone is in the range of about 0.5/1 to about 2/1.

15. The process of claim 1 wherein the polar organic compound is N-methyl-2-pyrrolidone.

16. The process of claim 1 which further comprises the addition of a fluid after step (c) to cool the contents of the vessel.

17. The process of claim 16 wherein the fluid is selected from the group consisting of N-methyl-2-pyrrolidone, water, or mixtures thereof.

18. A polymer produced by the process of claim 1.

19. A polymer produced by the process of claim 8.

20. A polymer produced by the process of claim 12.

21. A polymer produced by the process of claim 14.

* * * * *